United States Patent [19]

Keary et al.

[11] Patent Number: 4,758,970

[45] Date of Patent: Jul. 19, 1988

[54] MARINE LOADING ARM MONITORING SYSTEM

[75] Inventors: John R. Keary, Biloxi, Miss.; Michael J. Mondloch, Milwaukee; Renaldo F. Schritt, New Berlin, both of Wis.

[73] Assignee: Emco Wheaton, Inc., Conneaut, Ohio

[21] Appl. No.: 638,749

[22] Filed: Aug. 8, 1984

[51] Int. Cl.[4] .................. G01B 11/00; B63B 27/00; B63B 35/30; B65G 63/00

[52] U.S. Cl. .................. 364/559; 364/562; 364/167; 414/137; 414/139; 414/718; 901/46

[58] Field of Search .................. 364/559, 562, 513, 167; 137/615; 414/137, 138, 139, 718; 340/686; 901/46, 47

[56] References Cited

U.S. PATENT DOCUMENTS

| | | | |
|---|---|---|---|
| 2,906,179 | 9/1959 | Bower | 364/561 |
| 3,638,211 | 1/1972 | Sanchez | 364/567 |
| 4,050,585 | 9/1977 | Wilms | 137/615 |
| 4,084,247 | 4/1978 | Ball | 364/559 |
| 4,109,688 | 8/1978 | Jameson | 137/615 |
| 4,123,750 | 10/1978 | Leney et al. | 364/167 |
| 4,142,551 | 3/1979 | Wilms | 137/615 |
| 4,202,372 | 5/1980 | Gibbons | 137/615 |
| 4,205,308 | 5/1980 | Haley et al. | 364/559 |
| 4,299,261 | 11/1981 | Talafuse | 137/615 |
| 4,323,975 | 4/1982 | Ball | 364/559 |
| 4,327,784 | 5/1982 | Denniston | 414/138 |
| 4,360,886 | 11/1982 | Kostas et al. | 364/513 |
| 4,362,977 | 12/1982 | Evans et al. | 364/513 |
| 4,388,948 | 7/1983 | Carmnati et al. | 137/615 |
| 4,402,350 | 9/1983 | Ehret et al. | 33/1 MP |
| 4,408,943 | 10/1983 | McTamaney et al. | 414/138 |
| 4,412,206 | 10/1983 | Schwefel | 901/46 |
| 4,504,918 | 3/1985 | Axmann | 414/139 |

*Primary Examiner*—Errol A. Krass

*Assistant Examiner*—Danielle B. Laibowitz

*Attorney, Agent, or Firm*—Pearne, Gordon, McCoy & Granger

[57] ABSTRACT

An apparatus for monitoring the spatial position of a reference point relative to a predetermined origin, the reference point being located on an articulated marine loading arm having a plurality of pivotally interconnected fluid conduits forming pivot angles at the interconnections of the conduits, includes segments subtended by the pivot angles and means are provided for sensing lengths of the segments as the loading arm articulates. The sensing means generate electrical signals proportional to the segment lengths and a computer receives the electrical signals and calculates the position of the reference point therefrom based on the known geometry of the loading arm.

11 Claims, 5 Drawing Sheets

FIG. 9

11/11/83 15:23:40

ARM POSITION COORDINATES (FEET)

| | #1 | #2 | #3 | #4 | #5 |
|---|---|---|---|---|---|
| X | -10.5 | 0.0 | 0.0 | 0.0 | 0.0 |
| Y | 2.4 | 0.0 | 0.0 | 0.0 | 0.0 |
| Z | 5.6 | 0.0 | 0.0 | 0.0 | 0.0 |

ARM VELOCITY (FT/MIN)

| | | | | |
|---|---|---|---|---|
| 1.4 | 0.0 | 0.0 | 0.0 | 0.0 |

WIND VELOCITY 7 MPH

WIND DIRECTION 120 DEGREES

MARINE LOADING ARM MONITORING SYSTEM

BACKGROUND OF THE INVENTION

The invention, generally, relates to marine loading arms. More specifically, the invention relates to a monitoring system, used with articulated marine loading arms, which senses and displays the position in space of a reference point on the loading arm.

PRIOR ART

A marine loading arm is an articulated device used to on-load or off-load fluids between a vessel and a loading region such as a dock, wharf or pier. Such devices are particularly useful in the petroleum transportation industry for which tremendous volumes of fluid must be transferred safely between the moored carrier and the dock.

A marine loading arm typically includes a vertical mounting structure supporting a fulcrum about which a primary arm pivots. A secondary arm is pivotally linked to one end of the primary arm and a counterweight is attached to the opposite end of the primary arm to balance the same about the fulcrum. The secondary arm has an end flange attached thereto which is coupled to a flange support on the vessel manifold to access the fluid. In a typical off-loading operation, fluid passes through the end flange coupling into the secondary arm, thereafter into the primary arm and then out through an exit pipe or conduit supported by the stationary mounting structure. The path of flow is reversed for a typical on-loading operation.

Three dimensional movement of the articulated arm and, thus, the end flange, is accomplished by pivotal movement of the primary arm about the fulcrum and the secondary arm pivoting with respect to the primary arm. Also, the fulcrum is carried on an upper portion of the mounting structure which is rotatably coupled to a lower portion of the mounting structure by a swing joint, thus allowing the articulated primary and secondary arms to slew about the longitudinal axis of the mounting structure.

Such a loading arm device can be controlled by hydraulic actuators of the piston-cylinder type which pivot the articulated arms so as to position the end flange at a desired coupling location.

Transportation vessels typically pitch, roll and yaw due to wave action during the fluid transfer operations and can change height relative to the dock due to tide action. Such movement may cause the loading arm to be overstressed and damaged if the end flange moves to a position outside a predetermined safe envelope of operation. Consequently, monitoring systems are used to ascertain the position and movement of the arm segments or the end flange and to sound an alarm whenever predetermined limits of safe operation are reached or exceeded.

One such monitoring system known heretofore is shown in U.S. Pat. No. 4,084,247 (Ball). Such a system uses angle sensors such as potentiometers or limit switches to produce electrical signals representative of the angles between the several articulated limbs. Also described is the use of synchro resolvers to produce electrical signals proportional to the sine and cosine of these angles.

This system has the disadvantages of using angle sensors, particularly of the potentiometer type, which can have associated reliability problems due to deleterious environmental effects. The synchro resolvers and other angle sensors can have complicated mounting structures and are not convenient when pivot joints are not of the pin and bearing type. Even more disadvantageous, however, is the substantial and complex electronic circuitry which must be used to perform the signal processing and resolution. In addition to the resolvers, the Ball monitoring system requires summing amplifiers, comparators, an oscillator with sine and square wave outputs, passive phase shifters, balancing elements and transformers, to name a few of the numerous components.

Two other systems shown in the prior art are described in U.S. Pat. No. 4,205,308 (Haley et al.) and U.S. Pat. No. 4,402,350 (Ehret et al.). Haley et al. shows again the use of potentiometers as angle transducers, which may be undesirable from a reliability viewpoint, or absolute shaft angle encoders requiring particularized mounting structures. Ehret et al. shows the use of cameras and transmitting diodes to predict movement of the arm outside the working area or envelope.

It is clear, therefore, that the need exists for a simplified monitoring system, adapted to a marine loading arm device, which can be easily installed on the loading arm and requires minimal peripheral circuitry to ascertain the position of a reference point on the loading arm.

SUMMARY OF THE INVENTION

The present invention provides a new and useful position monitoring system for a marine loading arm. The loading arm includes a vertically oriented support column which elevates the articulated movement arms above the dock. A primary elevation arm is pivotally attached to the support column on a fulcrum. A secondary elevation arm is pivotally linked to the primary arm such that an articulated assembly is thereby formed.

Articulation of the primary and secondary elevation arms is accomplished by hydraulic actuators of the piston-cylinder type. Mounted on the actuators in a piggyback configuration are displacement sensors of the linear position sensing type. The linear sensor forms a variable segment of one side of a triangle and produces an electrical signal indicative of the length thereof. The other two sides of the triangle are predetermined by the location of the attachment points of the sensors, and the pivot points of the articulated arms.

A computer is provided to receive the electrical signals from the sensor elements and to calculate, according to a predetermined set of constants and equations, the exact position in space of a reference point on the articulated loading arm and to compare the actual position of the reference point in space to a set of predetermined operating zones or coordinates and to operate an alarm based on the loading arm movement through the zones. The movement of the reference point is determined at periodic time intervels and an average arm drift velocity is calculated and compared to predetermined limits. Peripheral hardware to facilitate operator use is also provided including a color graphics terminal, a printer and an audible alarm.

BRIEF DESCRIPTION OF THE DRAWINGS

FIG. 9 shows a typical display of data generated by the monitoring system depicted in FIG. 6.

PREFERRED EMBODIMENT OF THE INVENTION

Figure 1:
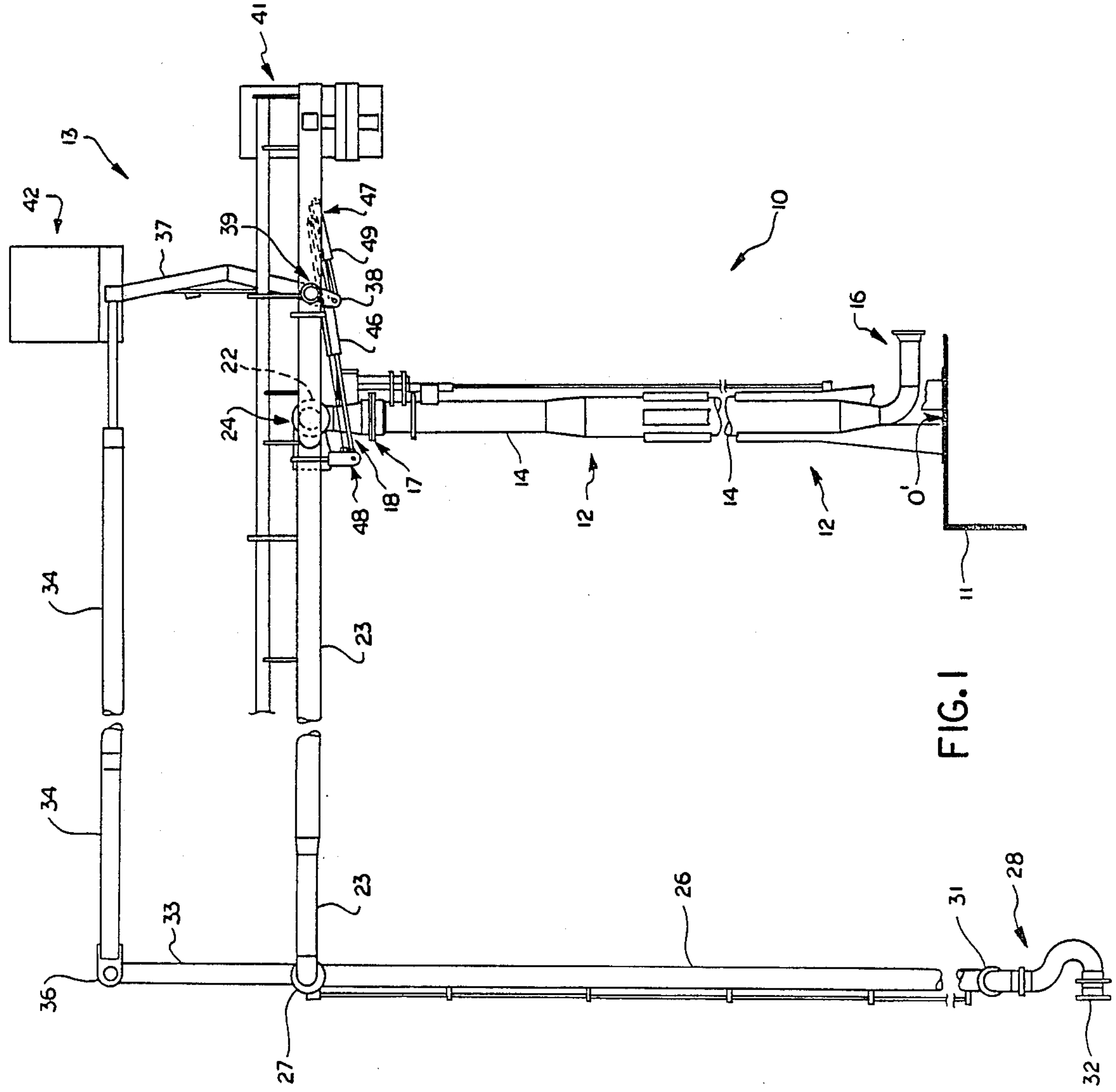
FIG. 1 shows a side elevation view of a marine loading arm and monitoring system according to the present invention.

A marine loading arm and monitoring system according to the concepts of the present invention are shown in FIG. 1. A loading arm assembly 10 is located on a dock 11 or similar structure from or to which fluid, such as petroleum, is to be transferred between a vessel (not shown) and transporters or holding areas on the dock.

Assembly 10 includes a mounting structure or support column 12 extending upwards from dock 11. Support 12 carries at its upper end the articulated elevation arms and counterweights, generally indicated by the numeral 13. Support 12 provides a fluid conduit 14 which is connected to an exit pipe and flange assembly 16. Flange assembly 16 may be coupled to a holding tank, transportation vehicle or similar means to either on-load or off-load fluid therefrom.

A swing joint assembly 17 is coupled to the upper end of conduit 14. Swing joint 17 provides a rotatable fluid coupling between the fulcrum base conduit 18 and conduit 14. That is, conduit 18 is coupled to swing joint 17 in axial alignment with pipe 14, whereby joint 17 provides a conduit coupling for the flow of fluid between conduit 18 and pipe 14 and simultaneously permits conduit 18 to rotate freely or slew with respect to pipe 14 about their common longitudinal axis. A suitable swing joint for use with the present invention is Model D1010 manufactured by Emco-Wheaton, Gulfport, Miss.

Figure 2:
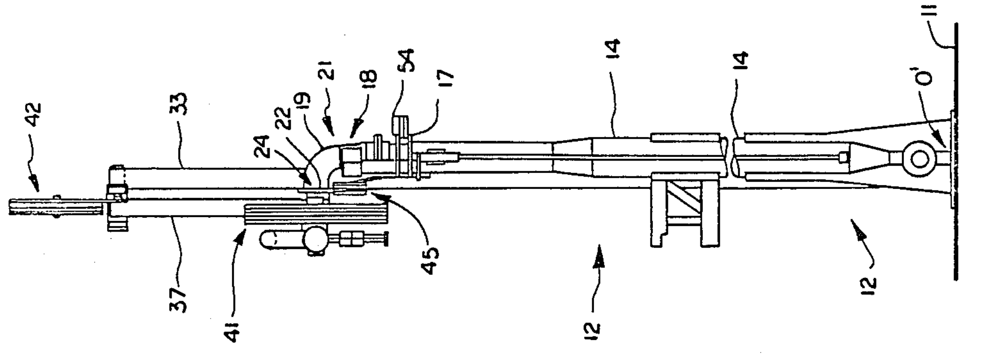
FIG. 2 shows a rear elevation view of the marine loading arm shown in FIG. 1.

As best shown in FIG. 2, fulcrum base conduit 18 extends upwardly from swing joint 17 and then is curved as at 19 to form a substantially right-angled conduit elbow 21. Elbow 21 is joined at its upper end to a second swing joint assembly 22 which may be of similar construction to swing joint assembly 17. Swing joint 22 rotatably couples a primary elevation arm 23 to elbow 21 (FIG. 1). Thus, arm 23 pivots about a fulcrum 24 having a location defined by the position of swing joint 22. Primary elevation arm 23 is a fluid conduit which is free to rotate or swing in a vertically oriented plane as by pivoting about fulcrum 24 and also is free to rotate or swing in a horizontal plane, as by slewing about the longitudinal axis of conduit 14, via swing joint 17.

Primary arm 23 is pivotally coupled to a secondary elevation arm 26 as by a third swing joint 27. Secondary arm 26 is a fluid conduit which is free to pivot with respect to primary arm 23 by means which will be described shortly hereinafter. Secondary arm 26 carries at its lower end a vessel manifold coupling assembly 28 which is coupled to arm 23 through a swing joint as at end flange 31. Assembly 28 is coupled to the vessel flange support (not shown) with a flange 32 to permit on-loading and off-loading of the fluid. The particular configuration of the elbows and swing joints of assembly 28 may vary as a function of the particular vessel and location of the vessel flange support. Consequently, in the preferred embodiment of the present invention, the position of end flange 31, referred to as the primary reference point, is monitored. The secondary reference point, specifically flange 32, is thereby indirectly monitored as it is assumed to be vertical and parallel to the dock edge. Of course, the position of flange 32 could be directly monitored as the primary reference point according to the present invention, if so desired.

Figure 3:
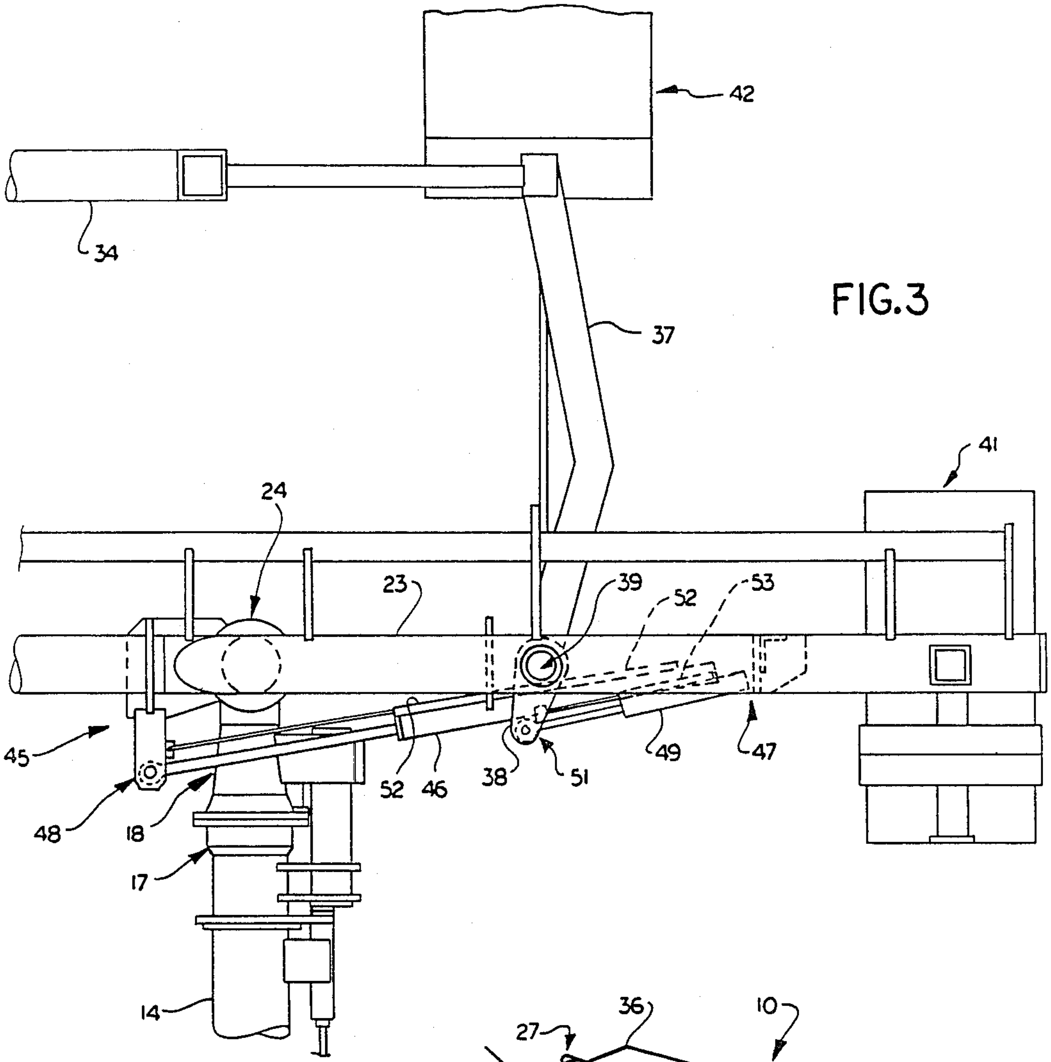
FIG. 3 shows an enlarged view of the mounting of the hydraulic actuators and linear displacement sensors shown in FIG. 1.

As best shown in FIGS. 1 and 3, attached to an upper portion 33 of secondary arm 26 is a linkage element 34. Element 34 is pivotally linked to arm 26 by a conventional coupler 36. At its opposite end, linkage element 34 is pivotally linked to one end of a secondary link 37. The opposite end of secondary link 37 is pivotally linked to a rocker plate 38 which is linked to primary arm 23 as at 39. Rotation of rocker plate 38 about pivot point 39 causes secondary arm 26 to pivot with respect to primary arm 23 as by the various linkage members.

As described hereinbefore, primary arm 23 is rotatable in the X-Z plane because it is mounted on swing joint 17. Since secondary arm 26 is movably linked to primary arm 23, three dimensional movement of end flange 31 (primary reference point) is achieved by the articulated arm assembly 10. A plurality of counterweights 41 and 42 are provided to balance the primary and secondary arms, respectively, about pivot points 24 and 39.

Figure 4:
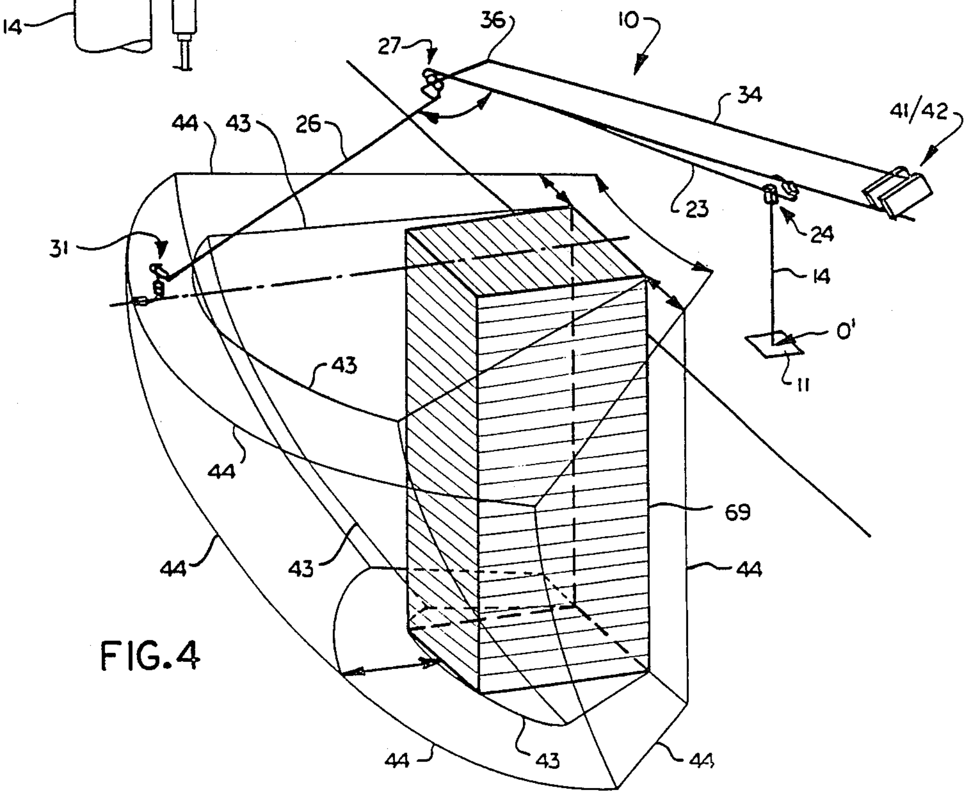
FIG. 4 shows a typical envelope of operation for the loading arm shown in FIG. 1; the loading arm being shown somewhat diagrammatically.

The spatial movement of primary reference point 31 can best be described as an envelope of operation. Such an envelope 43 is depicted in FIG. 4. Assembly 10 is shown somewhat diagrammatically. The origin, designated 0' in the drawings, is defined to be the position of the longitudinal centerline of conduit 14 at the base of support column 12. The particular size of envelope 43 and its geometry will be a function of the particular configuration of assembly 10 and the nature of the loading area and vessels. The physical operating zone 44 is defined as the volume of space through which the reference point can be located. The allowable operating zone or envelope 43 is the region within which the reference point can be moved without triggering an alarm, which will be more fully described hereinafter. The shaded region 69 is referred to as the normal operating zone. These and other zones to be defined hereinafter are based on an ad hoc determination as a function of the geometries of the specific loading area and the maximum allowable stress loads which the elevation arms, flanges and couplers can withstand, the envelope depicted in FIG. 4 being shown for exemplary purposes. Once the envelopes and operating zones have been defined in terms of the X, Y, Z coordinates (such as units of length in feet or inches) referenced to the origin, these values are stored in a computer for data comparison with actual position readings of the primary reference point 31, as will be more fully described hereinafter.

In the preferred embodiment of the present invention, selectable movement of the primary arm 23 and the secondary arm 26 is accomplished by the use of extensible hydraulic actuators, for example, of the piston-cylinder type. Referring to FIGS. 1 and 3, a primary actuator 46 is mounted with one end pivotally linked to primary arm 23 as at 47 and the opposite end linked to support column 12 as at 48. The coupling at 48 to support column 12 may be accomplished by means of a knuckle assembly 45. Thus, linear extension or compression of actuator 46 drives primary arm 23 to pivot about fulcrum 24. A secondary actuator 49 is mounted with one end pivotally linked to primary arm 23, which may conveniently be near or at position 47 as with the primary actuator 46. The opposite end of secondary actuator 49 is pivotally linked to rocker plate 38 as at 51. Thus, linear extension or compression of actuator 49 causes rocker plate 38 to pivot about point 39 and thereby drives secondary arm 26 pivotally with respect to arm 23 as described hereinbefore.

Of course, movement of primary arm 23 and secondary arm 26 also occurs due to motion of the loading vessel caused by wave action and tidal effects. Such movement is generally random and, therefore, the primary reference point may be moved to a position which causes undesirable stresses to be applied to the coupling flanges or the elevation arms. It is therefore important to monitor the movement of the arm whether caused actively by control of the actuators, or passively by movement of the vessel or both.

In order to ascertain the position of a reference point on articulated arm assembly 10 it is necessary to determine the X, Y and Z coordinates of the reference point with respect to the origin. This determination preferably is made on a real time basis so that any instant the reference point passes out of the allowable operating zone an alarm or warning is given to an operator.

The present invention provides a simplified means for ascertaining the actual spatial coordinates of the reference point by mounting linear displacement sensors on the hydraulic actuators in a "piggyback" configuration and then using a computer to calculate numerous mathematical formulae to determine the X, Y, Z coordinates therefrom. Such a system obviates the need for complicated or unreliable angle measuring transducers or potentiometers and associated peripheral signal processing circuitry as shown in the prior art.

Referring to FIG. 3, a primary sensor 52 is shown mounted on primary actuator 46 in a piggyback fashion and may conveniently be pivotally attached near points 47 and 48 so that sensor 52 operates substantially in unison with actuator 46. In the preferred embodiment, sensor 52 is mounted substantially parallel with and adjacent to actuator 46 so that linear extension of actuator 46 causes substantially similar movement of sensor 52. A secondary sensor 53 is shown mounted on secondary actuator 49 and may conveniently be pivotally attached near points 47 and 51 so that sensor 53 operates substantially in unison with actuator 49. Thus, a greatly simplified mounting structure is provided for the sensor elements.

Figure 5:
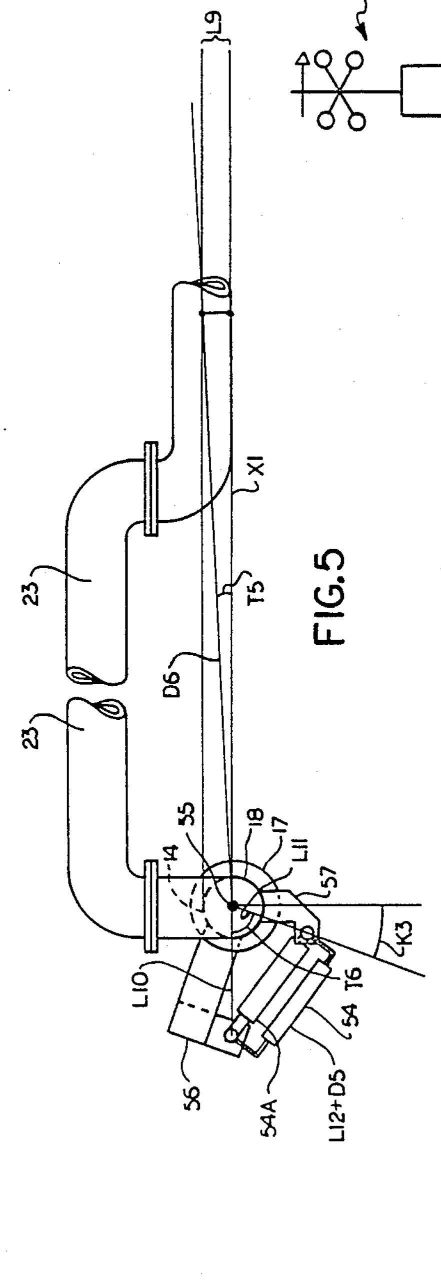
FIG. 5 shows a plan view of a mounting configuration for a slew axis sensor used with the loading arm shown in FIG. 1.

A slew axis sensor 54 is attached to support column 12 in a piggyback fashion with a slew axis actuator 54A. As best shown in FIG. 5, one end of slew sensor 54 and actuator 54A is coupled to stationary conduit 14 as by link 56 and the other end of sensor 54 and actuator 54A is coupled to fulcrum base conduit 18 as by link 57. Thus, linear extension and compression of actuator 54A causes the elevation arms and counterweight assembly 13 to rotate about the longitudinal axis of conduit 14, specifically the pivot point 55, which is the geometric center of swing joint 17.

Displacement sensors 52, 53, 54 are of the linear position sensing type, such as manufactured by Electro-Flo, Redmond, Wash. Sensors 52, 53 and 54 utilize a lead screw and nut to transform linear motion into rotary motion, which in turn is sensed by a conventional absolute optical encoder. The encoder determines absolute position immediately upon power up and, therefore, does not require a reference establishing operation. The working stroke of sensors 52 and 53 is equal to the stroke of the associated actuating cylinder since the sensor is mounted approximately at the same attachment points. The working stroke of slew sensor 54 is determined by the angle of rotation of conduit 18 with respect to conduit 14. The encoders of sensors 52, 53 and 54 produce a digitized electrical signal (TTL level gray code) indicative of the distance of the extension of each sensor.

The optical encoders used by sensors 52, 53 and 54 require low voltage, typically about 5 to 12 volts and 1.5 amperes D.C. maximum current.

Figure 6:
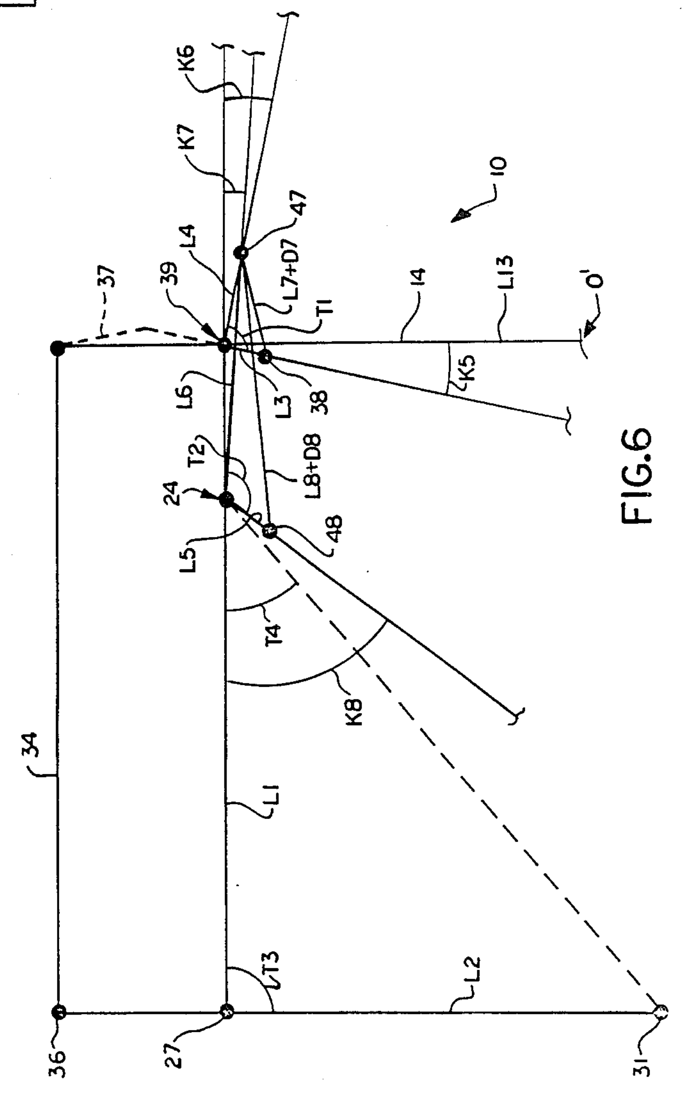
FIG. 6 shows schematically the geometric relationships among the various actuators, sensors and conduits of the loading arm shown in FIG. 1.

FIGS. 5 and 6 depict geometric diagrams of the various angles and distances used to calculate the X, Y and Z coordinates of the primary reference point 31. Table 1, appended hereto and incorporated by reference herein, provides a cross-reference between the designators in FIG. 1 and the labels of FIGS. 5 and 6. The only monitored data values needed are the distances D5, D7 and D8 supplied by sensors 52, 53 and 54. These absolute distances, represented by digitized electrical signals, can be easily inputted to a computer and then used with geometric and mathematical calculations to compute the X, Y, Z coordinates.

Referring to FIGS. 5 and 6, the following calculations are performed to derive the X, Y and Z coordinates of the primary reference point 31. All distances are predetermined by the geometry of apparatus 10 except D5, D7 and D8 which change in accordance with the working stroke of sensors 52, 53 and 54. Linear sensor elements 52, 53 and 54 form a variable segment of one side of a triangle subtended by the associated pivot angle. The lengths of the other two sides of the triangle are defined by the geometry of the pivot points 24, 39 and 55 and the sensors 52, 53, 54 attachment points defined hereinbefore. Thus, the pivot angles can be determined by the law of cosines and the pivot angles can be used to calculate the X, Y and Z coordinates of the reference point according to the following equations:

The labels L and D refer to lengths, T an K refer to angles. All geometric reference on FIGS. 5 and 6 begin with T, K, D or L. All other numbers indicate positions or elements corresponding to the numeral designators on FIGS. 1 and 5.

1. Measure $D7$

2. $D1 = L7 + D7$

3. $T1 = \cos^{-1}\left[\frac{(L3^2 + L4^2) - D1^2}{(2 \cdot L3 \cdot L4)}\right]$

4. $T3 = T1 - K5 + K6$

5. $D9 = \sqrt{(L1^2 + L2^2) - (2 \cdot L1 \cdot L2) \cdot \cos(T3)}$

6. $T4 = \cos^{-1}\left[\frac{(L1^2 + D9^2) - L2^2}{(2 \cdot L1 \cdot D9)}\right]$ -continued 7. Measure $D8$

8. $D2 = L8 + D8$

9. $T2 = \cos^{-1}\left[\frac{(L5^2 + L6^2) - D2^2}{(2 \cdot L5 \cdot L6)}\right]$

10. $T9 = T2 + T4 + K7 + K8$

11. $X1 = D9 \cdot \cos(T9)$

11A. $Y1 = D9 \cdot \sin(T9)$

12. $\underline{Y = Y1 + L13}$

13. $D6 = (\sqrt{X1^2 + L9^2}) \cdot \left(\frac{X1}{|X1|}\right)$

14. $T5 = \cos^{-1}\left[\frac{X1}{D6}\right]$

15. Measure $D5$

16. $D3 = L12 + D5$

17. $T6 = \cos^{-1}\left[\frac{(L10^2 + L11^2) - D3^2}{(2 \cdot L10 \cdot L11)}\right]$

18. $T7 = T5 - (T6 - K3)$

19. $Z1 = D6 \cdot \sin(T7)$

20. $\underline{Z = Z1}$

21. $X2 = D6 \cdot \cos(T7)$

22. $\underline{X = -X2}$

Figure 7:
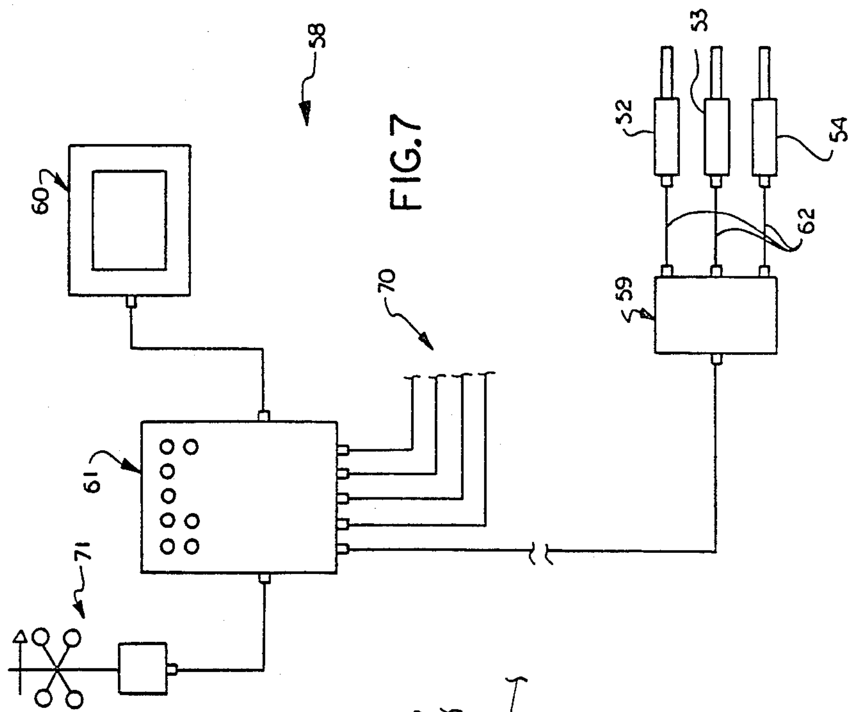
FIG. 7 is a block diagram of a monitoring system used with the marine loading arm shown in FIG. 1.

FIG. 7 shows in block diagram form, a monitoring system 58 which is used to carry out the concepts of the present invention. System 58 includes, generally a local electronics unit 59, a monitoring unit 60 and a central electronics unit 61. Electrical connection between local unit 59 and sensors 52, 53 and 54 is accomplished using a multiconductor cable 62 attached to each encoder by a connector.

Local unit 59 may be conveniently located near the loading arm support column 12, as close as possible to the sensors 52, 53 and 54 to minimize cable loading and noise. Unit 59 receives the output signals of sensors 52, 53 and 54 and processes them as necessary for inputting to central electronics unit 61. Such signal processing may include amplification, filtering and multiplexing particularly when several loading arms are being monitored by one central unit 61. Local electronics unit 59 contains the encoder interfaces and multiplexers, power supplies for the encoders and interfaces to the central electronics unit 61. Such circuitry will, of course, be determined by the particular microprocessor selected, as is well known to those skilled in the art. In the preferred embodiment, unit 59 contains a microprocessor which converts the gray code to binary for all three encoders of sensors 52, 53 and 54 and transmits these signals to unit 61 in serial format.

Figure 8:
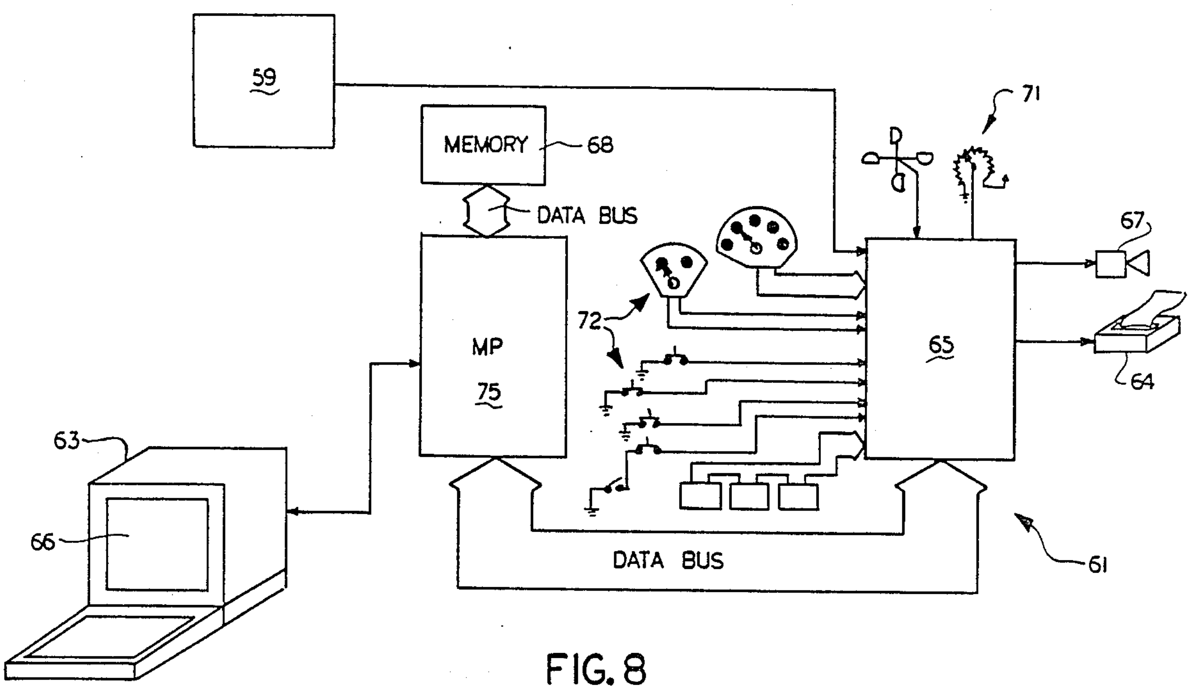
FIG. 8 depicts, somewhat schematically, more detail of the monitoring system outlined in FIG. 6.

Central electronics unit 61 (FIG. 8) includes a main computer 65 and interfaces to local unit 59. A microprocessor 75 which is used in the preferred embodiment is the INTEL 88/25, 8088, based microcomputer board, manufactured by INTEL, Santa Clara, Calif. Programming is accomplished in accordance with manufacturer supplied instructions. Monitoring unit 60 (FIG. 7) may include a conventional CRT 63, printer 64 and color graphics display 66 (FIG. 8).

A program particularly suitable for use with the preferred system (FIG. 7) performs at least the following: sequential reading of sensors 52, 53 and 54, calculation of the reference point spatial position based on the sensor readings and loading arm 10 geometry in accordance with the equations indicated hereinabove, display of position data numerically on a CRT 63 or printer 64 or with a graphics display 66 on CRT 63, and activation/deactivation of an alarm 67 based on the actual position of the reference point in relation to predefined alarm zones stored in a memory register 68 of unit 61.

Of course it is to be understood that the hardware and program can be modified to include additional memory and software capacity in order to monitor more than one loading arm with the same central unit 61, as indicated by additional input lines 70, since most loading docks utilize more than one apparatus 10. All the hardware described or shown herein is available and workable by methods well known to one skilled in the art.

Microprocessor 75 is programmed to have each axis encoder output (slew, primary and secondary sensors) sampled at least two times per second in the preferred embodiment and faster scan rates may be used particularly in systems having few loading arms 10 being monitored.

Monitoring system 58 provides progressive warnings and alarms to the operator when the actual position of reference point 31 is outside a predetermined envelope of operation described hereinbefore, the coordinates thereof being stored in memory 68. Different warnings can be given for each area or region entered into by reference point 31. In the preferreed embodiment, a two-level warning system is provided. First, a position warning indicates movement of the monitored point from a safe region of operation to an allowable region wherein the loading arm can be operated but which is approaching unacceptable stress levels. Second, an alarm warning indicates that the articulated arm has moved such that the monitored reference point is beyond the allowable region and is in the physical operating zone which defines the limit of physical movement of the loading arm. Such movement of the loading arm can occur actively by the operator using the actuators or may occur passively due to movement of the vessel after an on-loading or off-loading operation has begun.

Referring to FIG. 4, physical operating zone 44, previously described herein, is that volume of space through which the reference point 31 can physically travel. An allowable operating zone or envelope 43 is that region in which reference point 31 can be located without triggering an alarm warning described hereinbefore. A normal operating zone 69 (shaded region of FIG. 4) is that region in which reference point 31 can be located without triggering an alarm or position warning. For each field site these various zones can be defined by spatial coordinates, for example in terms of feet, referenced to origin 0' and stored in memory 68. In the preferred, when point 31 moves from zone 69 into zone 43, a position warning is given, as by changing the color of the position data displayed on color graphics display 66. Should the reference point 31 move out of allowable zone 43 and into physical operating zone 44, an alarm 67 (FIG. 8) can be sounded or visually displayed on CRT 63 and thereafter the operator can activate actuators 46, 49 and 54A to bring reference point 31 back into a safe zone such as zone 43 or 69 or totally disconnect assembly 10 from its mooring.

In addition to monitoring the actual position of reference point 31, computer 65 is programmed to calculate the average velocity or drift of point 31 over a period of time by dividing distance traveled by the sample time period. If the average drift exceeds a predetermined limit stored in memory 68, an arm velocity warning can be given to the operator by convenience of CRT 63 or alarm 67.

Computer 65 is also programmed to display the position and velocity information in tabular form on CRT 63, in graphics form via graphics display 66 or a hard copy via printer 64. Computer 65 can also monitor wind speed and direction by interfacing an anemometer 71 thereto. FIG. 9 shows a typical tabular display of reference point 31 position data as it appears on CRT 63 or as an output from printer 64. The date and time indications may be provided from computer 65 as a convenience for the operator or for historical records. A plurality of operator actuated dial or pushbutton switches 72 may be provided in a conventional manner to manually control which loading arm 10 is currently being monitored and displayed on CRT 63 and printer 64.

Inasmuch as the present invention is subject to many variations, modifications and changes in detail, a number of which have been expressly stated herein, it is intended that all matter described through this entire specification or shown in the accompanying drawings be interpreted as illustrative and not in a limiting sense, the invention being measured by the scope of the appended claims and not by particulars of the specification and drawings. It is evident then, that an apparatus constructed according to the concepts of the present invention, and reasonably equivalent thereto, will accomplish the same and otherwise substantially improve the art of monitoring marine loading arms.

TABLE I

| FIG. 1 Designator | FIG. 6 Reference | FIG. 5 Designator | FIG. 5 Reference |
|---|---|---|---|
| 23 | L1 | 54 | L12 + D5 |
| 26 | L2 | 56 | L10 |
| 46 | L8 + D8 | 57 | L11 |
| 49 | L7 + D7 | | |

What is claimed is:

1. An apparatus for monitoring spatial position of a reference point on an articulated marine loading arm having a plurality of pivotally interconnected fixed-length fluid conduits forming variable pivot angles at the interconnections thereof, comprising: segments subtended by the pivot angles, means for sensing lengths of said segments and generating signals proportional thereto, and computing means for receiving said signals and calculating the spatial position of the reference point therefrom relative to a predetermined origin.

2. The apparatus according to claim 1 wherein said segments are formed by extensible linear actuators attached to said interconnected conduits whereby said actuators cause pivotal movement of the conduits to move the reference point to a selectable location.

3. The apparatus according to claim 1 wherein said sensing means are linear displacement sensors attached to said interconnected conduits.

4. The apparatus according to claim 2 wherein said sensing means are linear displacement sensors attached to said interconnected conduits adjacent to and substantially parallel with said extensible actuators.

5. The apparatus according to claim 1 wherein said computing means includes means for storing a predetermined set of coordinates corresponding to an allowable envelope of operation for the reference point, said computing means periodically comparing said calculated spatial position of the reference point with said predetermined set of coordinates and generating a warning when the reference point moves outside said allowable operating envelope.

6. An apparatus for monitoring the position in space of a reference point on an articulated arm assembly having a plurality of pivotally interconnected arms forming pivot angles at the interconnections thereof, comprising; extensible members subtended by the pivot angles, said members driving the interconnected arms, extensible sensors operating with said extensible members and generating signals proportional to lengths of said members, and computing means to receive said signals and calculate the spatial position of the reference point therefrom, relative to a predetermined origin.

7. The apparatus according to claim 6 wherein said extensible members are linear hydraulic actuators.

8. The apparatus according to claim 6 wherein said sensors are linear displacement sensors attached to the interconnected arms adjacent to and substantially parallel with said extensible members.

9. The apparatus according to claim 6 wherein said computing means includes means for storing predetermined sets of coordinates corresponding to regions of operation for the reference point, said computing means calculating the position of the reference point relative to said regions and generating signals indicative of the reference point being positioned in a particular one of said regions.

10. An apparatus for monitoring the position in space of a reference point on an articulated marine loading arm having a plurality of pivotally interconnected arms forming pivot angles at the interconnections thereof and hydraulic actuators causing articulation of the arms and subtended by the pivot angles, comprising: linear displacement sensors for measuring lengths of the actuators and generating electrical signals proportional thereto and computer means for receiving said signals and calculating the spatial position of the reference point relative to a preselected origin.

11. The apparatus of claim 10 wherein said computer means includes memory means for storing a set of coordinates corresponding to an allowable envelope of operation for the reference point, said computer means generating a signal when the reference point is positioned outside the coordinates of said envelope.

* * * * *